Jan. 18, 1955  J. H. STEVENS  2,700,087
ELECTRICAL CONTACT MEMBER
Filed May 31, 1949

FUSED ZONE

FUSED ZONE

FUSED ZONE

Inventor
Joseph H. Stevens
By W.E. Bijou
Attorney

United States Patent Office 2,700,087
Patented Jan. 18, 1955

2,700,087

ELECTRICAL CONTACT MEMBER

Joseph H. Stevens, Wauwatosa, Wis., assignor to Cutler-Hammer, Inc., Milwaukee, Wis., a corporation of Delaware Application May 31, 1949, Serial No. 96,247

1 Claim. (Cl. 200—166)

This invention relates to electrical contact members and methods of producing the same, which methods, while not limited thereto, are particularly advantageous in the production of relatively small contact tips on contact supporting members of relatively thin section.

Heretofore great difficulties have been encountered in the art in the provision of small contact tips on contact supporting members of relatively thin stock. Several methods have heretofore been proposed, including: the method of forming a contact tip with a shank and then riveting such a contact tip to its supporting member; and the method of forming a contact tip to a desired shape and then brazing or welding it to its supporting member. The first method was disadvantageous in that the riveted contact tips did not provide the degree of mechanical and electrical connection desired between the contact tip and its support. Moreover, the riveted contact tip was prone to work loose during operation and was subject to electrolytic action. Similarly brazing of an already formed contact tip to its supporting member was found objectionable particularly where the support had previously been hardened, and in any event created an objectionable heat-affected zone. Moreover, brazing was particularly difficult where the supporting member had a bend nearby.

Welding of a contact tip to its supporting member to produce a contact member was found to be virtually impossible by conventional methods where supporting members of relatively thin stock and necessarily small contact tips were involved. Conventional methods of welding resulted in melting and dissipation of the contact tip material before welding took place, and a splatter or flash-out to the side regularly occurred. Moreover, welding by conventional methods frequently caused the thin stock of the supporting member to be burned through.

Also accurate positioning of the contact tip with reference to its support was very difficult when any of the foregoing methods were utilized in connection with relatively small contact tips and supporting members of thin stock; the proper mass of contact material for the contact tip was difficult to predetermine; and its desired final shaps or configuration difficult to attain.

A primary objective of the present invention is to obviate the difficulties of prior art methods of producing contact members of the character described, and to provide a method of producing a novel contact member having the desired characteristics.

Another and more specific object of the invention is to provide contact members wherein a superior mechanical and electrical connection is secured between a contact tip and its supporting member, and more particularly to provide a contact member wherein a contact tip is both welded or fused with its supporting member and mechanically interlocked therewith.

Another object is to provide a contact member having an integrally formed double-faced contact tip.

Another object is to provide a novel method of producing electrical contact members of relatively small size wherein a contact tip is welded or fused with its supporting member.

Another object is to provide a contact member of the character herein contemplated wherein the amount of contact tip material for a contact tip of given mass is minimized.

Another object is to provide a novel method of producing contact members wherein a superior mechanical and electrical connection is afforded between a contact tip and its supporting member, such connection comprising both a fusion or weld and a mechanical interlinkage.

Another object is to provide a novel method of producing contact members of the character described wherein forming of a contact tip to desired shape and attachment thereof to a supporting member is accomplished simultaneously.

Another object is to provide a novel method of producing a double-faced contact tip wherein such contact faces are produced simultaneously.

Another object is to provide a novel method of producing contact members of the character described wherein the mass of contact tip material may be closely and expeditiously determined and more particularly to utilize contact tip material in a form which facilitates expeditious determination of its mass and facilitates automatic feeding to produce contact tips of corresponding mass and desired shape.

Another object is to provide a novel method of producing contact members of the character described wherein accurate positioning of a contact tip relative to its supporting member is facilitated.

Another object is to facilitate and reduce the cost of production and attachment of electrical contact tips to provide electrical contact members affording the superior characteristics described.

Other objects and advantages of the invention will hereinafter appear.

The accompanying drawings illustrate a preferred form of electrical contact member produced in accordance with the invention, and a preferred method of producing the same.

In the drawings, Figure 1 somewhat schematically illustrates a contact supporting member having a body of contact tip material positioned thereon, the whole being interposed between a pair of suitably recessed welding electrodes preparatory to a contact tip forming and attaching operation; certain parts being shown in section.

Fig. 2 somewhat schematically illustrates a combined contact tip forming and attaching operation to produce a contact member in accordance with the invention; certain parts being shown in section.

Figure 1:
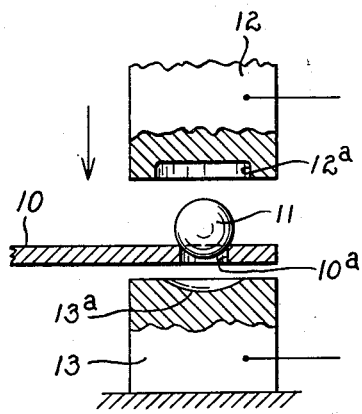
Figure 2:
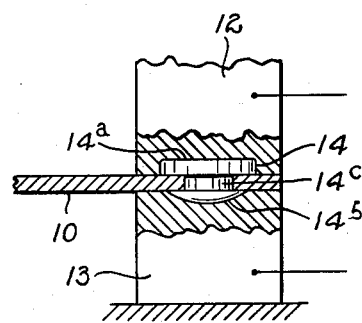

Referring first to Figs. 1 and 2, the reference numeral 10 designates a contact supporting member of suitable form and of material of good electrical conductivity, as, for example, a non-ferrous material such as Phosphor bronze or beryllium copper. Said supporting member 10 is provided with a relatively small hole 10a, drilled, punched, or otherwise formed at the point at which it is desired to have a contact tip.

A mass of suitable contact material 11, as, for example, a metal having high electrical conductivity such as fine silver, and having a dimension slightly greater than the diameter of said hole 10a, is then positioned in contact with the supporting member 10 in alinement with the aforementioned hole 10a. The mass of the aforementioned contact material 11 should substantially correspond with the mass desired in the completed contact tip and is preferably in the form of a sphere or drop-shot as produced in accordance with the invention described in the copending application of M. R. Swinehart, S. N. 704,186, filed October 18, 1946, and assigned to the assignee of the present application. Provision of the contact tip material in the form of a sphere or drop-shot, as will be understood, permits determination of the mass of contact material by the simple expedient of grading or sorting of the spheres according to size, facilitates automatic feeding of the contact material by a hopper or otherwise, and affords ease of positioning of the body of contact material in alinement with the hole 10ª of contact supporting member 10.

Figure 3:
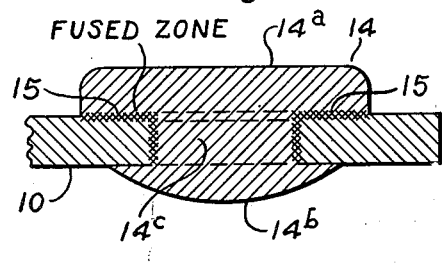
Fig. 3 is a somewhat schematic fragmentary section of one form of completed contact member produced in accordance with the invention.

The contact supporting member 10, with a body of contact material 11 thereon as described, is then interposed between a pair of relatively movable welding electrodes 12 and 13 having suitable recesses 12ª and 13ª, respectively, of configuration to form the shape desired in the completed contact tip; the electrodes recessed as shown in Figs. 1 and 2, for example, producing a contact tip of the form and shape illustrated in Fig. 3, it being understood that the space afforded by recesses 12ª, 13ª, and hole 10ª substantially exactly corresponds in volume to the mass of contact material 11 employed. Said electrodes 12 and 13 are relatively movable and upon actuation by means not shown are adapted to apply an initial pressure to said supporting member 10 and said body of contact material 11, the latter being alined with said electrode recesses 12ª and 13ª, and said hole 10ª as previously described.

As illustrated in Fig. 2, electrode pressure is then applied to the parts simultaneously with an impulse of welding energy supplied by means not shown; but preferably of a known type to supply one-half cycle of welding energy. The aforedescribed simultaneous application of pressure and welding energy tends to melt the body of contact material 11 causing a portion thereof to be pressed or forced through the hole 10ª in supporting member 10 into a reservoir formed by recess 13ª of electrode 13, which reservoir aids in elimination of the flash-out objectionable to methods practiced by the prior art. As will be apparent, the aforementioned melting of the contact tip material affords formation of a contact tip 14 including contact face 14ª, reverse face 14ᵇ and an intermediate connecting portion 14ᶜ, within recess 12ª, recess 13ª and hole 10ª, respectively. Simultaneously with the formation of contact tip 14 to the desired shape as aforesaid, fusion or welding between contact tip 14 and supporting member 10 takes place along the area best shown in Fig. 3; namely, the underside of contact face 14ª and around the connecting portion 14ᶜ, the forcing of molten contact material through hole 10ª tending to clean off any oxides present to afford a better weld or fusion.

The completed contact member illustrated in Fig. 3 produced by the method hereinbefore described comprises a supporting member 10 and a contact tip 14 of integral form having a contact face 14ª, reverse face or head 14ᵇ and connecting portion 14ᶜ extending through hole 10ª in contact member 10. As will be apparent, the aforestated structure affords a contact tip mechanically connected to its supporting structure by virtue of the interlock therewith afforded by the fact of its being headed on both ends. Additionally the contact tip 14 is mechanically and electrically connected with supporting member 10 by virtue of its fusion therewith, the fused zone 15 being, as illustrated, in the area of the underside of contact face 14ª and the circumferential area of connecting portion 14ᶜ. Welding or fusion does not occur adjacent the reverse face 14ᵇ, inasmuch as the location of the weld zone depends upon the original location of the body of contact material 11 with reference to supporting member 10, welding taking place only on the side thereof contacting the body of contact material. It will be obvious, however, that if it is desired to have the welded or fused zone on the opposite surface of contact supporting member 10, the body of contact material 11 may initially be placed contacting the underside of such supporting member.

Figure 4:
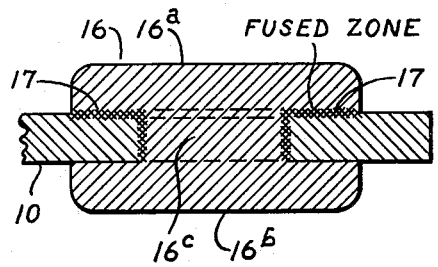
Fig. 4 is a somewhat schematic fragmentary section of a modification of the form of completed contact member illustrated in Fig. 3 to provide a double-faced contact tip.

In Fig. 4 is illustrated a modification of the contact member shown in Fig. 3, the contact tip 16 of Fig. 4 being double-faced and having integrally formed similarly shaped contact faces 16ª, 16ᵇ connected by an intermediate portion 16ᶜ. The welded or fused zone 17 is shown as being on the top surface of supporting member 10 and as extending down through the circumferential surface of connecting portion 16ᶜ, thus indicating that the body of contact material utilized was initially positioned on the top side of supporting member 10 in a manner similar to that illustrated in Fig. 1. As will be understood, the particular shape and size of the contact tip 16 is dependent upon the size and shape of the recesses provided in the welding electrodes employed, the mass of contact material utilized substantially corresponding to the mass required to fill the space afforded by said recesses and their interconnection through the hole 10ª in member 10 and hence substantially corresponding to the mass desired in the completed contact tip. The electrodes 12 and 13 may be recessed in any shape desired to provide a contact tip of corresponding shape.

Figure 5:
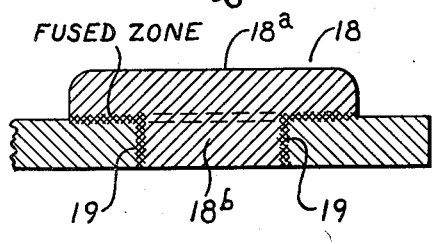
Fig. 5 is a somewhat schematic fragmentary section of a modification of the form of completed contact member illustrated in Fig. 3 to provide for minimization of the amount of contact tip material required for a contact tip of given size.

In Fig. 5 is illustrated a further modification of the contact member shown in Fig. 3, the contact tip 18 being headed at only one end thereof as at 18ª. Said headed end 18ª serves as a contact face while an integrally formed portion 18ᵇ extending through supporting member 10 provides a mechanical interlock therewith by virtue of its position within hole 10ª of the supporting member. Additionally a mechanical and electrical connection between contact tip 18 and supporting member 10 is afforded by welding or fusion therewith, the fused zone being as illustrated at 19, similar to that provided in the other forms of contact members hereinbefore described. As will be obvious, the contact member illustrated in Fig. 5 may be produced by the method illustrated in Figs. 1 and 2 except that welding electrode 13 is replaced by a welding electrode having a flat upper end to seal against the lower surface of supporting member 10, the space afforded by hole 10ª in supporting member 10 affording the reservoir hereinabove described in connection with the description of applicant's method. As will be apparent, the aforedescribed contact member permits minimization of the mass of contact tip material required for a contact tip of given size without materially affecting its desired characteristics.

It will be apparent to those skilled in the art that the electrical contact member hereinbefore described and the method of production thereof may be modified in respect of certain details thereof within the scope of the invention as defined by the appended claim.

The terms "fuse," "fused," "fusing," and "fusion" as used herein and in the appended claims with reference to the contact tip 14 and its mode of connection with supporting member 10, are to be understood to mean that type of connection characterized by grain growth between the boundaries of the metals joined (the "fused zone" shown in Figs. 3 to 5) as created by melting of portions of those metals and intermingling of such portions, such connection being afforded, for example, by simultaneous generation of heat and application of pressure as distinguished, for example, from connections afforded by the use of filler metals wherein the latter afford a bonding medium between the metal parts joined.

I claim:

An electrical contact member comprising a supporting member having a hole formed therein and a contact tip having a head formed into a desired final shape and fused to said supporting member, said tip further having a portion extending within and fused to the walls of said hole.

References Cited in the file of this patent

UNITED STATES PATENTS

| Number | Name | Date |
|---|---|---|
| 1,046,823 | McBerty | Dec. 10, 1912 |
| 1,132,094 | Hosford | Mar. 16, 1915 |
| 1,197,168 | Ziegler | Sept. 5, 1916 |
| 1,330,241 | Cutter | Feb. 10, 1920 |
| 1,665,762 | Waream | Apr. 10, 1928 |
| 1,907,931 | Henderson | May 9, 1933 |
| 2,101,156 | Payne | Dec. 7, 1937 |
| 2,137,617 | Imes | Nov. 22, 1938 |
| 2,252,899 | Reynolds | Aug. 19, 1941 |
| 2,275,438 | Hothersall | Mar. 10, 1942 |
| 2,354,081 | Weder | July 18, 1944 |
| 2,373,861 | Van Inwagen | Apr. 17, 1945 |
| 2,419,469 | Spiro | Apr. 22, 1947 |
| 2,468,888 | Mekelburg | May 3, 1949 |